Feb. 22, 1955 — R. A. HAMAKER — 2,702,631
PNEUMATIC SEPARATOR
Filed Aug. 25, 1950 — 4 Sheets-Sheet 1

Inventor
Russell A. Hamaker

Feb. 22, 1955
R. A. HAMAKER
2,702,631
PNEUMATIC SEPARATOR
Filed Aug. 25, 1950
4 Sheets-Sheet 2
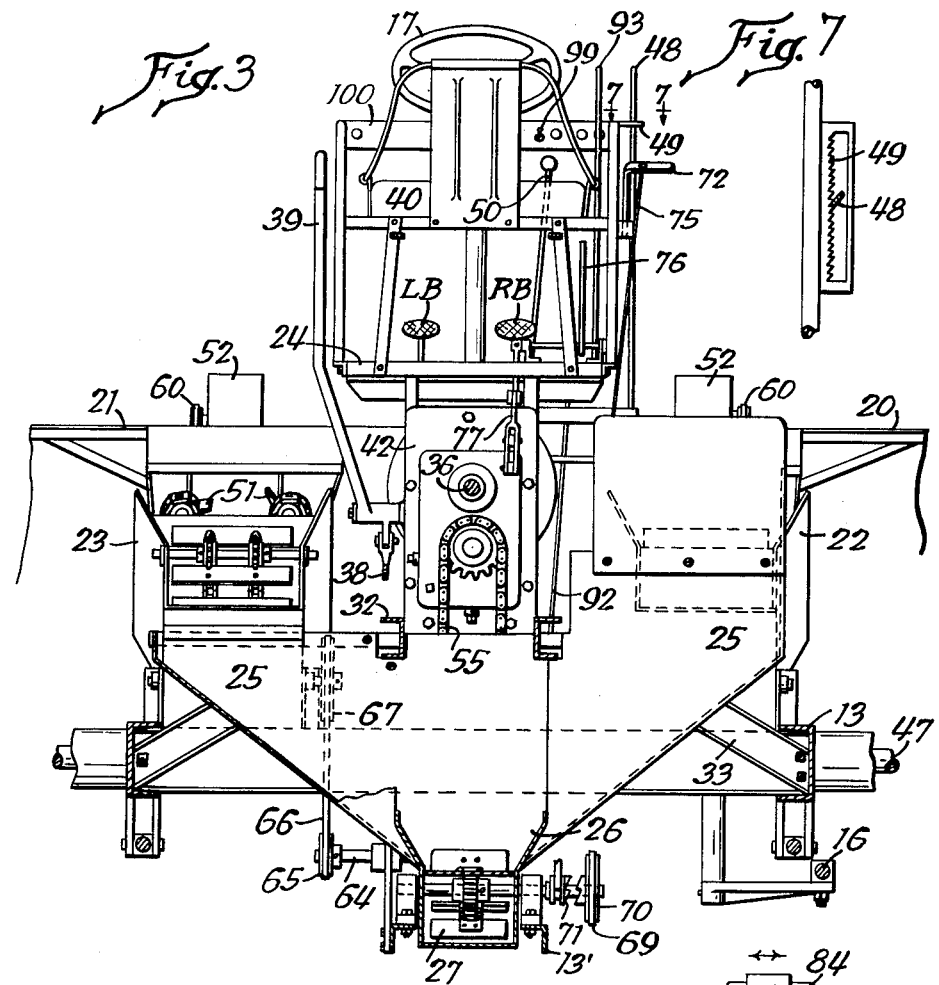
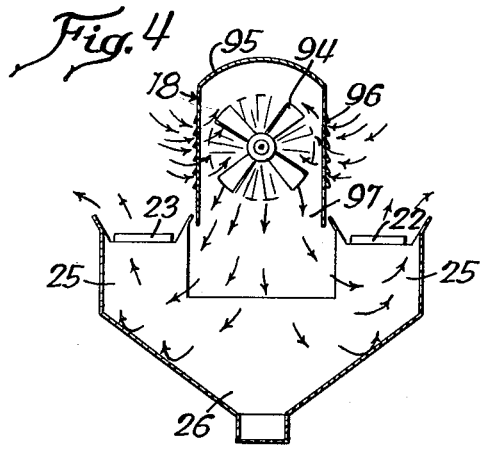
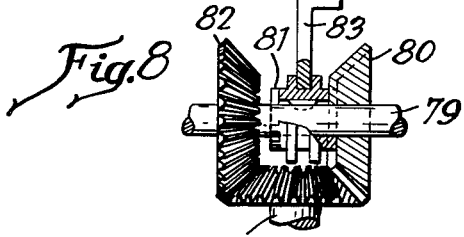
Inventor
Russell A. Hamaker
Andrew F. Wintercorn
Atty.

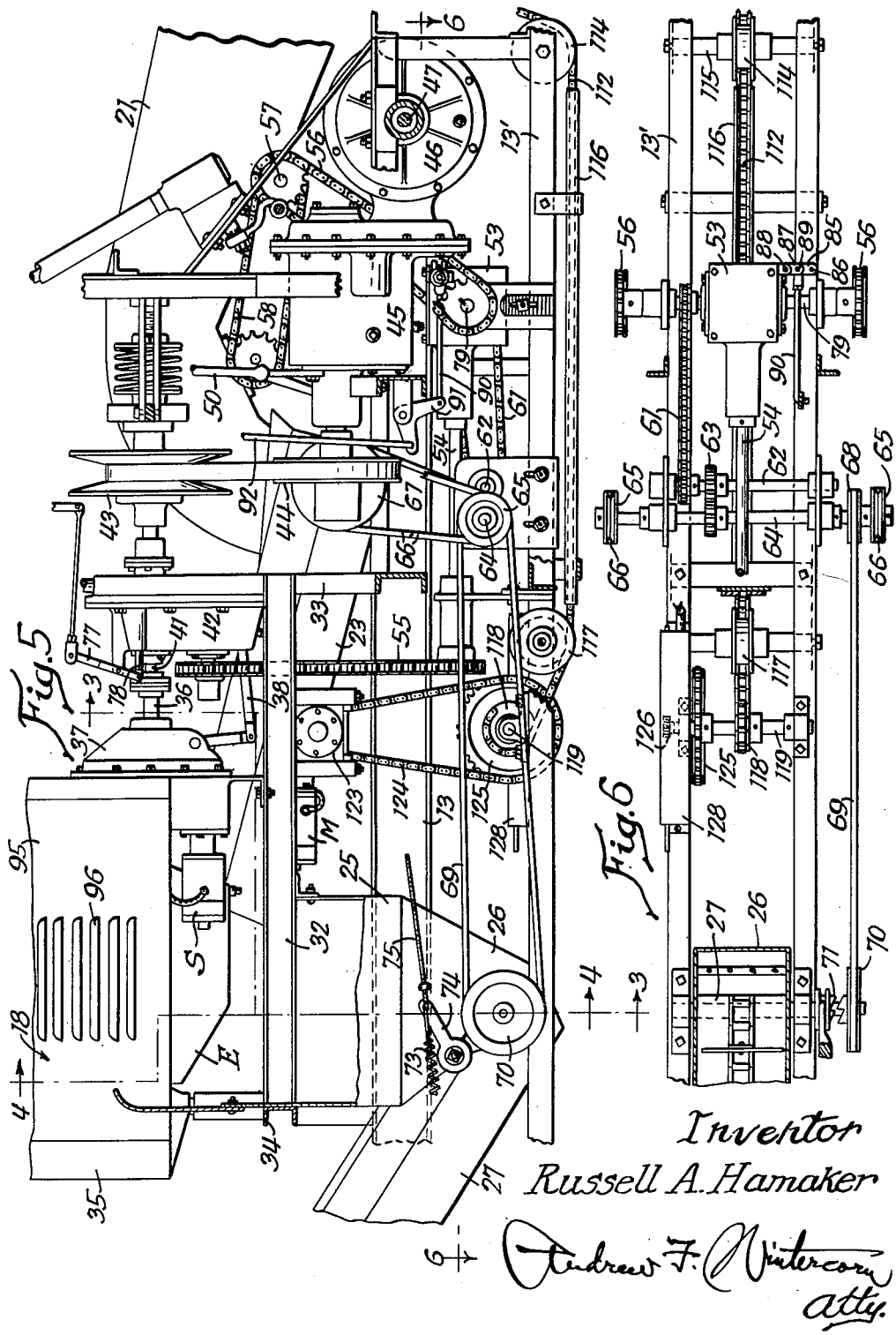

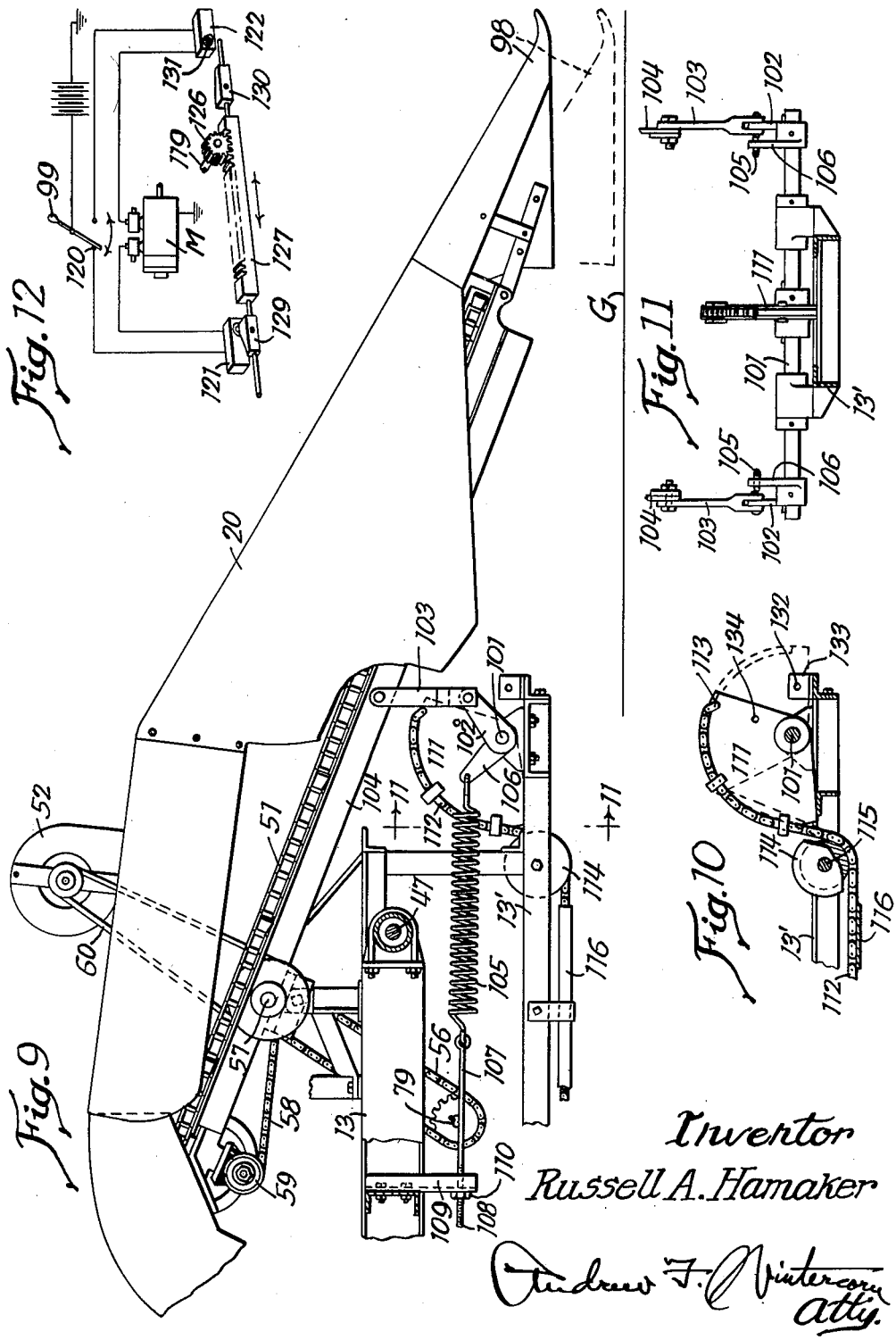

United States Patent Office 2,702,631
Patented Feb. 22, 1955

1

2,702,631

PNEUMATIC SEPARATOR

Russell A. Hamaker, Rochelle, Ill., assignor to L. H. Schultz Manufacturing Company, Rochelle, Ill., a corporation of Illinois Application August 25, 1950, Serial No. 181,532

2 Claims. (Cl. 209—136)

This invention relates to a new and improved self-propelled corn harvester, namely, one in which the corn picker units form assembled parts of the drive vehicle, as distinguished from the well known conventional type corn pickers which are adapted to be demountably attached to a tractor and detachably connected with the power take-off thereof.

I am aware that others have devised self-propelled corn harvesters, but those that I have seen were too wide and unwieldy to permit efficient operation in the field. These machines had the engines disposed crosswise of the frame with the conveying facilities intermediate the pickers at the front and the elevator at the rear extending on the longitudinal center-line of the machine over the engine, thereby making it impossible to provide the driver's seat at the middle of the front portion of the machine and making it necessary to station the driver off to one side. The transverse arrangement of the engine, of course, multiplied the problems of power transmission, not to mention the fact that the engine was not easily accessible for servicing. It is important for efficient operation of the machine to have the driver stationed at the middle of the front portion, where he can keep the two rows of corn being harvested in good view at all times, to enable instant stopping of the machine when that becomes necessary or desirable and to make adjustments of the picker units as conditions require, while at the same time remaining far enough above the pickers to avoid having to breathe in and be showered with the dirt and dust that is thrown off in the picking operation. It is, therefore, the principal object of my invention to provide a self-propelled corn harvester avoiding the objections mentioned.

In the machine of my invention, the driver's seat is located in forwardly spaced relation to and on the same longitudinal center-line of the frame with the engine, thereby enabling narrowing the machine so that it is more easily maneuverable in the field and may be turned on a shorter radius, the facilities for conveying the harvested ears, which facilities may include supplementary husking rolls and even shelling means, being extended rearwardly from the two picker units on opposite sides of the driver's platform and engine and emptying into the opposite downwardly inclined side portions of a hopper disposed transversely with respect to the frame and under the engine, and having the elevator on the rear of the machine extending from the bottom thereof for discharge of the ears into a wagon hitched on behind the machine. The driver is, therefore, stationed in a most advantageous position in relation to the two picker units, where he can continually check the operation of the machine intelligently without being too close to the picking rolls for comfort. The arrangement of the engine over the hopper is of advantage because the engine is left fully exposed for conventional servicing and a good portion of the air thrown by the engine fan, operating to draw in air through the engine radiator for cooling purposes, is discharged downwardly into the hopper and escapes out the opposite sides thereof, so as to carry away the finer dust and dirt thrown off in the husking operations.

Another object of my invention is to provide a machine of the character described in which the self-propelled vehicle carries the picker units and conveyor means in such a way that these may be easily dismounted and other units applied in place of them, as, for example, a windrower attachment for harvesting grain or hay,

2 the vehicle when stripped of the corn harvester equipment being suitable for the other purpose just mentioned and for various other duties around a farm, substantially as any tractor, namely, plowing, disking, cultivating, trucking, and so forth.

Other features of my improved corn harvester, worthy of special mention, are:

(1) Provision for immediate raising and lowering of the picker units under power and manual push-button control;

(2) Provision for instantaneous speed control of the vehicle over a wide range independently of changes in engine speed, with a view to keeping the machine operating most efficiently at all times, and (3) Provision for rear wheel steering and hydraulic braking of each of the two front wheels independently, with a view to easier maneuverability and shorter radius turning in the field, while also making the machine easier to run along highways to and from the field.

The invention is illustrated in the accompanying drawings, in which—

Fig. 3 is a cross-section on a still larger scale taken on the broken line 3—3 of Fig. 5 looking forwardly, as indicated by the arrows;

Fig. 4 is a cross-section on a scale smaller than that of Fig. 3 taken on the line 4—4 of Fig. 5 looking forwardly;

Fig. 5 is an enlarged longitudinal vertical section of the device taken on the line 5—5 of Fig. 2;

Fig. 6 is a horizontal section on the line 6—6 of Fig. 5;

Fig. 7 is a fragmentary sectional detail on the line 7—7 of Fig. 3;

Fig. 8 is an enlarged view with parts broken away and shown in section of the reverse gearing and clutch means enabling instantaneous reversal of the drive of the picker rolls;

Fig. 9 is a side view of the right hand picker unit with parts broken away and shown in section on the line 9—9 of Fig. 2 to show the elevating and lowering means;

Fig. 10 is an enlarged elevational view with parts broken away and shown in section of a portion of Fig. 9;

Fig. 11 is a cross-section on the line 11—11 of Fig. 9, and

Fig. 12 is a diagrammatic view and accompanying electrical circuit diagram for the power operated picker elevating means.

The same reference numerals are applied to corresponding parts throughout the views.

Figure 1:
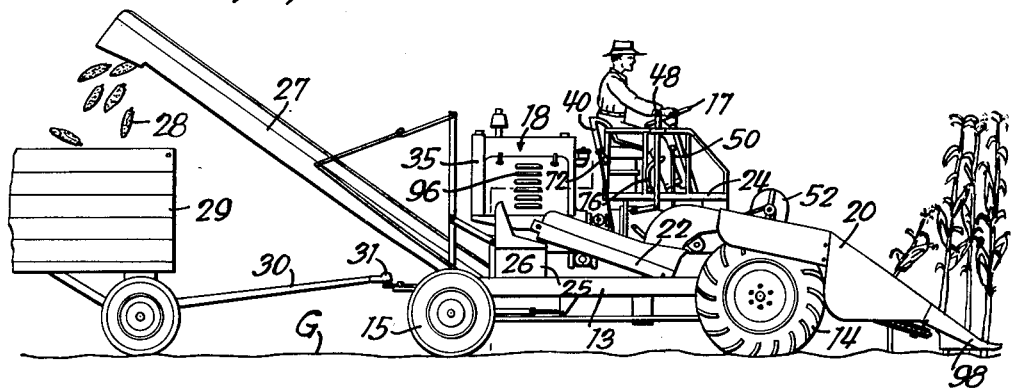
Fig. 1 is a side view of a self-propelled corn harvester made in accordance with my invention, and illustrated in operation.
Figure 2:
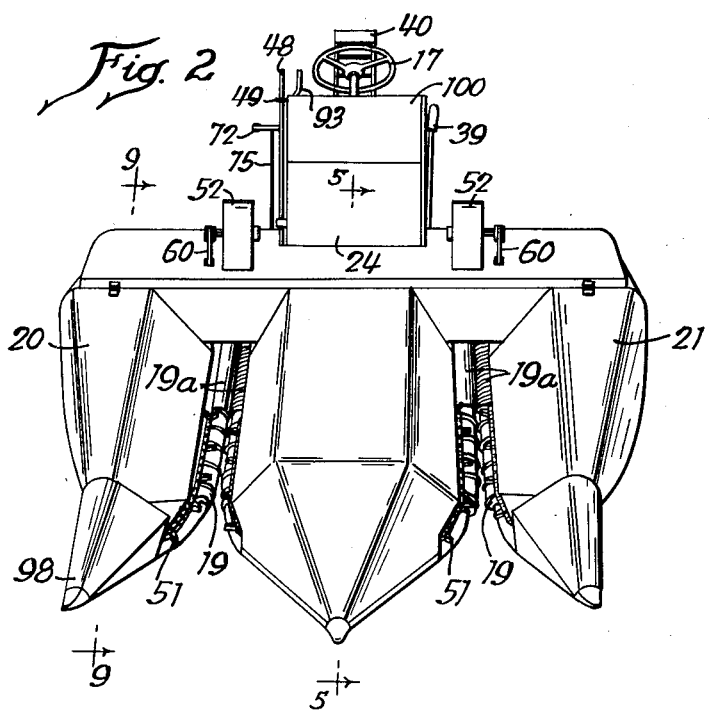
Fig. 2 is a front view of the machine, on a slightly larger scale.

Referring first mainly to Figs. 1 to 6, the reference numeral 13 designates the generally rectangular frame of the vehicle, on the front end of which is a pair of relatively large rubber tired drive wheels 14, and on the rear of which is a pair of relatively small steering wheels 15 that are arranged to be steered in the manner of the front steering wheels of an automobile by push and pull operation of a steering link connection 16, except that a reversing connection is provided between the steering wheel 17 and the link 16 as necessitated by the fact that the steering wheel 17 is on the front of the vehicle. The front wheels 14 are spaced to run on opposite sides of the two rows of corn being harvested, and the rear wheels 15 are aligned with them. The engine 18, which furnishes the motive power for driving the front wheels 14, also transmits drive to the picker rolls 19, which, of course, have the usual husking sections 19a, in the two picker units 20 and 21, and also drives the conveyors in the conveying units 22 and 23 that receive the husked ears discharged from the picker units 20—21, and, if the units 22—23 include additional husking rolls, they may subject the ears to some further husking before conveying the same rearwardly, the units 22—23 extending rearwardly from the picker units on opposite sides of the driver's platform 24 with upward inclination, as clearly appears in Fig. 1, to discharge the ears into the side portions 25 of the hopper 26. The latter extends transversely of the frame 13 under the engine 18. A conveyor 27 extends rearwardly and upwardly from the bottom of the hopper 26 to discharge the ears, as indicated at 28, into a wagon 29 which has its tongue 30 hitched to the rear end of the frame 13, as indicated at 31. The conveyor facilities 22—23, it should also be understood, may include shelling facilities of any suitable or preferred construction, in which event only the shelled corn would be discharged into the hopper 26.

The engine 18 is suitably enclosed and is disposed behind the driver's platform 24, and extends lengthwise of and in elevated relation to the frame 13 on the longitudinal centerline thereof, and is suitably supported on a pair of longitudinally extending channel members 32, which, in turn, are secured to and suitably supported on the main frame 13 by means of cross-members 33 and 34. The radiator 35 for the engine 18 is at the rear end, and the drive-shaft 36 of the engine extends forwardly from the clutch bell housing 37, the clutch being of the over-center type of any suitable or preferred construction operable by means of a link 38 connected suitably with a clutch lever 39 provided on the left hand side of the driver's platform 24 within convenient reach of the driver seated on the seat 40. The shaft 36 is coupled to another shaft 41 that extends through a reduction gear housing 42 to furnish drive to the manually controlled pulley 43 of a pair of belt-connected pulleys 43 and 44, furnishing a variable speed driving connection over and above that afforded by the change-speed gear box 45, to the input shaft of which the variable pulley 44 is connected. The gear box 45 provides three speeds forward and one reverse, and has its output shaft connected through differential gearing in the housing 46 to the usual pair of drive axles 47 connected, in turn, to the wheels 14 to transmit drive thereto. The lever 48 to the right of the driver is shiftable relative to a ratchet 49, to shift the movable half of pulley 43 to increase or decrease the speed of the vehicle when the gear shift lever 50, associated with the gear box 45, is in any one of the four positions for either of the three speeds forward or one speed in reverse drive, thereby giving the driver an extremely wide range of control, so that no matter how difficult the going may be under adverse conditions, there is no danger of stalling the engine or getting stuck. There is also no occasion, therefore, for overloading the engine and causing it to knock. This speed control is, furthermore, entirely independent of the power take-off afforded by the gearing in housing 42. This power take-off is the drive means for the picker (and husking) rolls 19—19a, stalk feed chains 51, and blowers 52, all of these facilities being connected with a gear box 53, the input shaft 54 of which has a chain and sprocket drive connection, as shown at 55, with the output shaft of housing 42. Chain and sprocket drive connections 56 are provided on opposite sides of gear box 53. Two drive shafts 57, which are drivingly connected with the rolls 19—19a in any suitable or preferred way and which also have chain and sprocket connections 58 for transmitting drive through the usual bevel gears 59, transmit drive to the stalk feed chains 51 in the usual way. Belt drives 60 are usually provided for the blowers 52, which function to blow the husks away as fast as they are stripped from the ears by the husking sections 19a of the picker rolls, in the usual way. An auxiliary power take-off is afforded by another chain and sprocket driving connection 61 to a counter-shaft 62, which is connected by gears 63 to a cross-shaft 64, on the opposite ends of which are pulleys 65 for cooperation with drive belts 66 that extend upwardly to drive the pulleys 67 on the inner sides of the conveyor units 22—23, whereby to drive these continuously as long as the power take-off 62 is connected. Still another pulley 68 provided on one end of the shaft 64 has a belt connection 69 with a pulley 70, which, when the clutch 71 is engaged by manipulation of the lever 72, serves to transmit drive to the elevator 27. The clutch 71 may, of course, be of any suitable or preferred type, the one herein indicated being operable by cam action and arranged to be held in engaged position by a spring 73 normally holding the lever 74 in one extreme position, and a rope 75 being provided to connect the lever 72 with the lever 74 to throw it to the other extreme position for disengagement of the clutch. The power take-off 62 is connectible and disconnectible by shifting the lever 76, which is connected through intermediate linkage to operate the lever 77 mounted on the back of the housing 42 and connected to the clutch member 78 extending into the housing 42. In that way the driver can engage or disengage the drive for the picker rolls 19, and whenever those rolls are in operation the conveyors in units 22 and 23 are in operation, and the driver has a separate control, by means of lever 72, of the elevator 27, so that he can stop that whenever a filled wagon is being removed and another wagon is being hitched in its place. Should the rolls become clogged with stalks or should some foreign object become lodged therebetween, in either of which events reversal in the direction of drive of the rolls 19 is desirable, such instant reversal is made possible by the reverse gearing shown in Fig. 8, in which the shaft 54 is the input shaft previously mentioned and the shaft 79 is the cross-shaft having the chain and sprocket drive connections 56 transmitting drive to the picker rolls and stalk feed chains. When the one bevel idler gear 80, shown in Fig. 8, is clutched by the clutch collar 81 to the shaft 79, the normal direction of drive is obtained for in-feed of corn stalks and snapping of ears therefrom by the rolls, but when the other bevel idler gear 82 is clutched to the shaft 79 by collar 81 in its other extreme position, the drive is reversed, and in that way I am enabled instantly to clear the rolls of any obstructions without the necessity for the driver leaving the platform 24 and running any risk whatsoever of injury. The collar 81 is shiftable to and fro by a fork 83 attached to a shaft 84, and this shaft has one pair of toggle links 85 pivotally attached to the outer end thereof, as at 86 in Fig. 6. Another pair of toggle links 87 is pivotally connected to the gear box 53, as at 88 in Fig. 6, and the two pairs of links 85 and 87 are pivotally connected together, as at 89, to a clevis on one end of a push and pull link 90. This push and pull link 90 is connected through a bellcrank lever 91 with another push and pull link 92, which, in turn, is operable to and fro by means of a hand lever 93 disposed to the right of the driver's seat.

The operation of the machine should be more or less clear from the foregoing description. After the engine 18 is started by means of the starter motor S, the driver shifts lever 50 usually for a forward speed, as first, second, or third speed, depending somewhat upon the high or low ratio position of lever 48 and somewhat upon the nature of the terrain to be traveled. Then, he will throw the clutch lever 39 to engage the clutch to start forward motion of the vehicle. Of course, lever 48 may be shifted at will as the machine travels in either direction, to increase or decrease the ground speed independently of a change in engine speed, by a change in the drive ratio relationship of pulleys 43 and 44. It is apparent, therefore, that a very wide range of speeds is available for both forward and reverse drive, and especially forward drive. The clutch 78 for the power take-off 42 may be engaged and disengaged at will to transmit drive to the picker rolls 19, feed chains 51, conveyor units 22—23, and elevator 27 when such drive is desired, the drive for the elevator 27 being separately disconnectible by operation of clutch 71 by lever 72. The driver can quickly stop the machine both as to forward travel and as to drive for the picker rolls if they suddenly get clogged; he need only throw clutch lever 39 to the disengaged position. Then, he can disengage the forward drive gears by shifting lever 50 to neutral position. Then, if he shifts lever 93 to reverse drive position and throws clutch lever 39 to engaged position, the rolls 19 and chains 51 will be driven in the reverse direction to clear out the stalks and whatever else may be causing the clogged condition. This is all done without leaving the platform, so that there is no danger whatever of the operator getting hurt, and, as is well known, very serious injuries have resulted from farmers accidentally getting a hand caught when trying to clear out an obstructing stalk or stick. The present machine is just as easily maneuverable in a field as an ordinary tractor, if not more so, it being no wider than the average tractor. The rear wheel steering herein shown makes for better and shorter radius steering. Also, I prefer to use separate hydraulic brakes on the two front drive wheels 14 and operate them separately by pedals LB and RB, so that one or the other of these wheels can be held at will to facilitate turning abruptly. The general design of this machine, having the engine 18 disposed as herein disclosed, behind the driver's platform 24, on the centerline of the frame 13 and with the hopper 26 arranged below the engine and receiving ears from conveyors 22—23 has many advantages, to wit:

(1) the drive connections for the engine are simplified and the engine can be serviced easily;

(2) the control connections are likewise simplified and shortened, and the driver is located where he can check the machine's operation easily and see what adjustments are necessary and when to stop the machine or slow up;

(3) the overall height as well as width of the machine is reduced to a minimum, and the machine, therefore, is less unwieldy and more easily maneuverable in the field, and, being more compact, costs less to build and looks much better all around;

(4) although the machine has ample ground clearance to run well in any corn field, it has a relatively low center of gravity and is not apt to roll over when run on the side of a hill;

(5) the picker facilities are as easily removed as those designed for tractors, and, therefore, the machine can easily be used as any tractor when the picker facilities are removed.

I can use the air from the cooling fan 94 of engine 18 as a dirt and dust expeller in connection with hopper 26, as shown in Fig. 4, so that the ears of corn carried away by conveyor 27 may be that much cleaner. The ears dropping off the upper ends of conveyors 22 and 23 into the inclined opposite ends 25 of hopper 26 will, of course, throw off some dust and dirt, which air discharging from the hopper in the direction of the arrows shown in Fig. 4 will serve in a good measure to expel with it, besides serving to reduce the likelihood of entry into the hopper of any of the fine dust and dirt liberated in the corn picking and husking operations and also in the conveying of the harvested ears. The fan 94, being disposed in the housing 95, between the engine block E and the radiator 35, is between the louvers 96 and the radiator 35, and operates in the opposite way from the fan on a tractor or automobile; that is, instead of drawing in cool air through the radiator and discharging the warm air through the louvers, draws in cool air through the louvers 96 and discharges it through the radiator, thereby using the forward motion of the machine to help take in the air. The louvers 96 for that reason may, if so desired, be vertically arranged opening forwardly, namely, toward the driver's platform 24, to improve the air pickup. In any event, there is enough air pressure created by the operation of the fan 94 in the housing 95, in the space 97 between the engine block and the radiator, to supply a sufficient amount of air for the purposes mentioned, this space being in open communication at the bottom with the hopper 26, as indicated in Fig. 4. This blower action is so beneficial, I may provide a special blower at this location.

The picker units 20 and 21, as shown in Fig. 9, are both pivoted relative to the frame 13 on the shafts 57 as a center to raise or lower their pointed lower ends 98 relative to the ground, indicated in Figs. 1 and 9 by the line G. It is, of course, well known that corn picker units require such adjustment, so that the picker rolls 19 can operate always at best advantage, sometimes higher up on the stalks, sometimes lower down, according to the height of the corn in different portions of a field, and in order to enable pick-up of an occasional stalk that may be down. It is, therefore, desirable to have the picker units responsive instantly to push-button control, especially where, as here, the machine is designed to be run rather fast, in relation to ordinary tractors. The toggle switch lever 99 on the dash 100 is the control for such operation of the units 20—21. A sub-frame 13', narrower than frame 13, is suitably suspended from and on the same center-line with frame 13, and, besides serving as a support for much of the power transmission gearing described above, as shown in Figs. 5 and 6, serves as a support for a cross-shaft 101, the opposite ends of which carry arms 102 that are connected by links 103 with the frames 104 of the picker units. Tension springs 105, one for each picker unit, serve substantially to counterbalance the weight of these units so that very little power is required to raise or lower the same, each spring being connected at one end to an arm 106 attached to shaft 101 and connected at its other end to a rod 107 having a threaded end 108 adjustably fixed to an arm 109 on the frame 13 by means of a nut 110. A sprocket segment 111, fixed to the middle portion of the shaft 101, has one end portion of a chain 112 meshed therewith and secured at its extremity thereto, as at 113. The chain 112 extends rearwardly and downwardly from the segment 111 under an idler pulley 114 carried on a cross-shaft 115 mounted in frame 13', and is slidable lengthwise of frame 13' in a channel guide 116 suspended therefrom. The rear end portion of the chain 112 extends upwardly after passing under another idler pulley 117 and meshes with and has its extremity attached to a sprocket 118, that is fixed to the middle portion of a cross-shaft 119 carried in frame 13'. Now, the shaft 119 is adapted to be turned only a fraction of a turn in either direction by means of a reversible electric motor M under control of the lever 99 of switch 120, as indicated in Fig. 12, the operation of motor M being limited in both directions by limit switches 121 and 122, to stop the motor when the picker units reach either a predetermined high level or predetermined low level. See the full line and dotted line positions of the picker units in Fig. 9, and the corresponding full line and dotted line positions of segment 111 in Fig. 10. Motor M has its armature shaft connected with reduction gearing in gear box 123, and a small sprocket on the output shaft of this gear box has a chain connection 124 with a larger sprocket 125 fixed on one end portion of shaft 119, so that there is a further reduction in the driving connection. A pinion 126 on the end of the shaft 119 meshes with a rack 127 guided for reciprocation in a housing 128 on frame 13', and this rack carries adjustably fixed cams 129 and 130 on the rods extending from the opposite ends thereof, which are arranged to depress spring-extended buttons 131 to break the circuits automatically. In operation, the switch lever 99 is normally disposed in a mid or "neutral" position, and then when the operator notices that a few stalks are down, requiring a lower setting of the picker units, he throws the switch lever downwardly and causes motor M to run in a direction to lower the picker units, the segment 111 turning in a clockwise direction as the chain 112 is paid out by sprocket 118 to allow the picker units to drop by gravity. If the switch lever 99 is held down long enough, the cam 130, which moves with rack 127, which, in turn, moves with chain 112, rides against the button 131 of limit switch 122 to limit the descent of the pickers. Otherwise, the pickers drop more or less depending upon how long the switch lever is held down. When the operator, looking ahead, sees that there is taller corn ahead, requiring a higher setting of the pickers, he throws the switch lever 99 upwardly, thereby causing motor M to run in the opposite direction from that for downward adjustment of the pickers, and, in this operation, the rack 127 again moves with the chain 112, and, if the operator leaves the switch lever 99 in the "up" position long enough, the cam 129, contacting the button 131 of limit switch 121, stops the motor M, leaving the picker units 20—21 in the upper limit position. The cam 129 is shown in that position in Fig. 12, and picker unit 20 is shown in full lines in the corresponding upper limit position in Fig. 9. In the shipment of one of these harvesters, the pickers 20—21 are operated to their lower limit position and supported by blocks inserted under their pointed lower ends 98, and a pin is inserted in the registering holes 132 in a pair of laterally spaced brackets 133 fixed to frame 13' and arranged so that segment 111 may move downwardly therebetween, as indicated in dotted lines in Fig. 10, at which time the hole 134 in the segment registers with the holes 132 to receive the pin, so as to lock the segment in the "down" position. In that way the pickers 20—21 and their connected parts are not apt to be damaged in shipment, as by vibration and consequent crystallization and breakage of parts.

It is believed the foregoing description conveys a good understanding of the objects and advantages of my invention. The appended claims have been drawn to cover all legitimate modifications and adaptations.

I claim:

1. In a harvesting machine of the character described, the combination of a vehicle comprising a wheel-supported frame in elevated relation to the ground, an engine supported in elevated relation to said frame and spaced inwardly from the opposite sides thereof, a hopper supported on the frame directly beneath the engine having laterally and upwardly extending open intake portions into which the material being harvested is discharged, an elevator extending from the hopper to deliver the material therefrom to a companion vehicle, an upright radiator in spaced relation to and connected with the engine having the engine coolant circulated therethrough, a fan between the engine and radiator driven by the engine to circulate air through the radiator, and an open-bottom housing disposed over the central portion of the hopper enclosing the engine and fan and extending to the radiator having air entrance openings provided therein on opposite sides of the fan, whereby air is circulated through the housing and radiator to cool the engine and radiator and some air is also forced downwardly into the central portion of the hopper and out through the opposed lateral intake portions of said hopper for the expulsion of dust and dirt discharged into the hopper with the material.

2. In a harvesting machine of the character described, the combination of a vehicle comprising a wheel-supported frame in elevated relation to the ground, an engine supported in elevated relation to said frame and spaced inwardly with respect to one side thereof, a hopper supported on the frame directly beneath the engine having a laterally and upwardly extending open intake portion into which the material being harvested is discharged, an elevator extending from the hopper to deliver the material therefrom to a companion vehicle, an upright radiator in spaced relation to and connected with the engine having the engine coolant circulated therethrough, a fan between the engine and radiator driven by the engine to circulate air through the radiator, and an open-bottom housing disposed over the hopper enclosing the engine and fan and extending to the radiator having air entrance openings provided therein on opposite sides of the fan, whereby air is circulated through the housing and radiator to cool the engine and radiator and some air is also forced downwardly into the hopper and out through the lateral intake portion of said hopper for the expulsion of dust and dirt discharged into the hopper with the material.

References Cited in the file of this patent

UNITED STATES PATENTS

| Number | Name | Date |
|---|---|---|
| 1,323,502 | Thomas et al. | Dec. 2, 1919 |
| 1,616,283 | Shirey | Feb. 1, 1927 |
| 2,152,273 | Otto | Mar. 28, 1939 |
| 2,323,087 | Everett | June 29, 1943 |
| 2,347,871 | Andrews et al. | May 2, 1944 |
| 2,399,740 | Hyman | May 7, 1946 |
| 2,473,655 | Lohn | June 21, 1949 |
| 2,525,481 | Flora | Oct. 10, 1950 |
| 2,543,310 | Andrews et al. | Feb. 27, 1951 |